Dec. 15, 1959   W. E. MEISSNER   2,916,864
PACKAGING APPARATUS
Filed Dec. 2, 1957   4 Sheets-Sheet 3
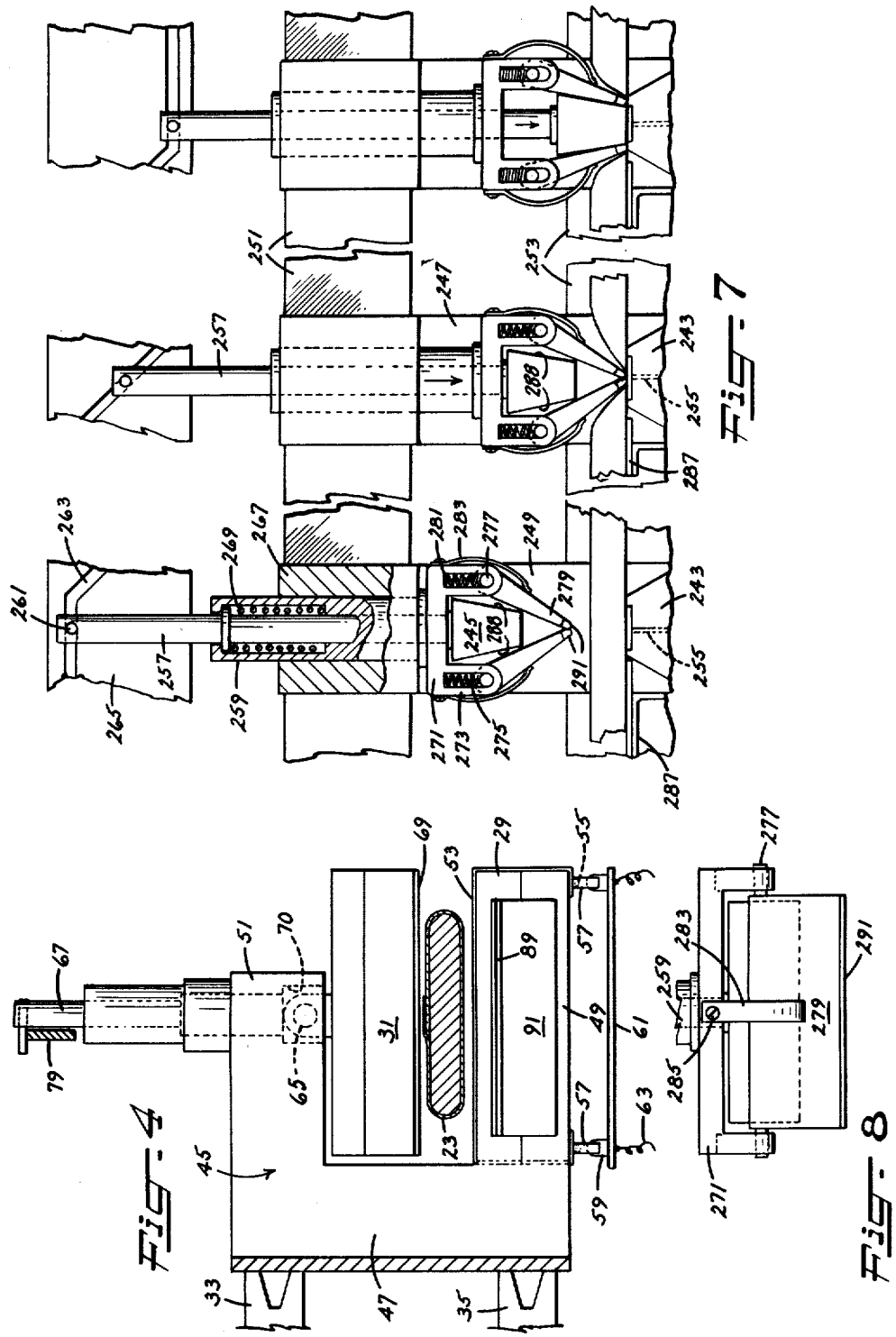

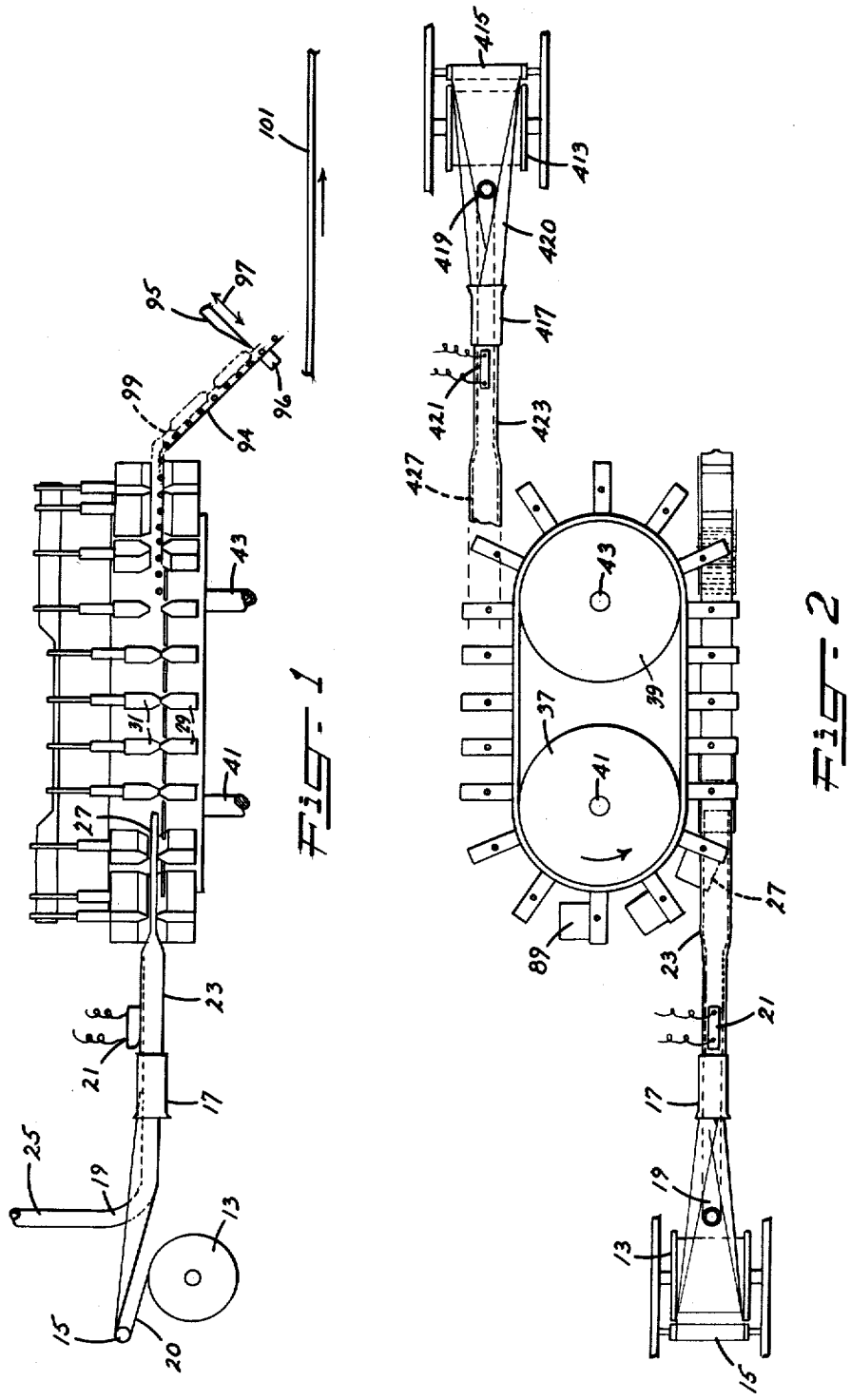

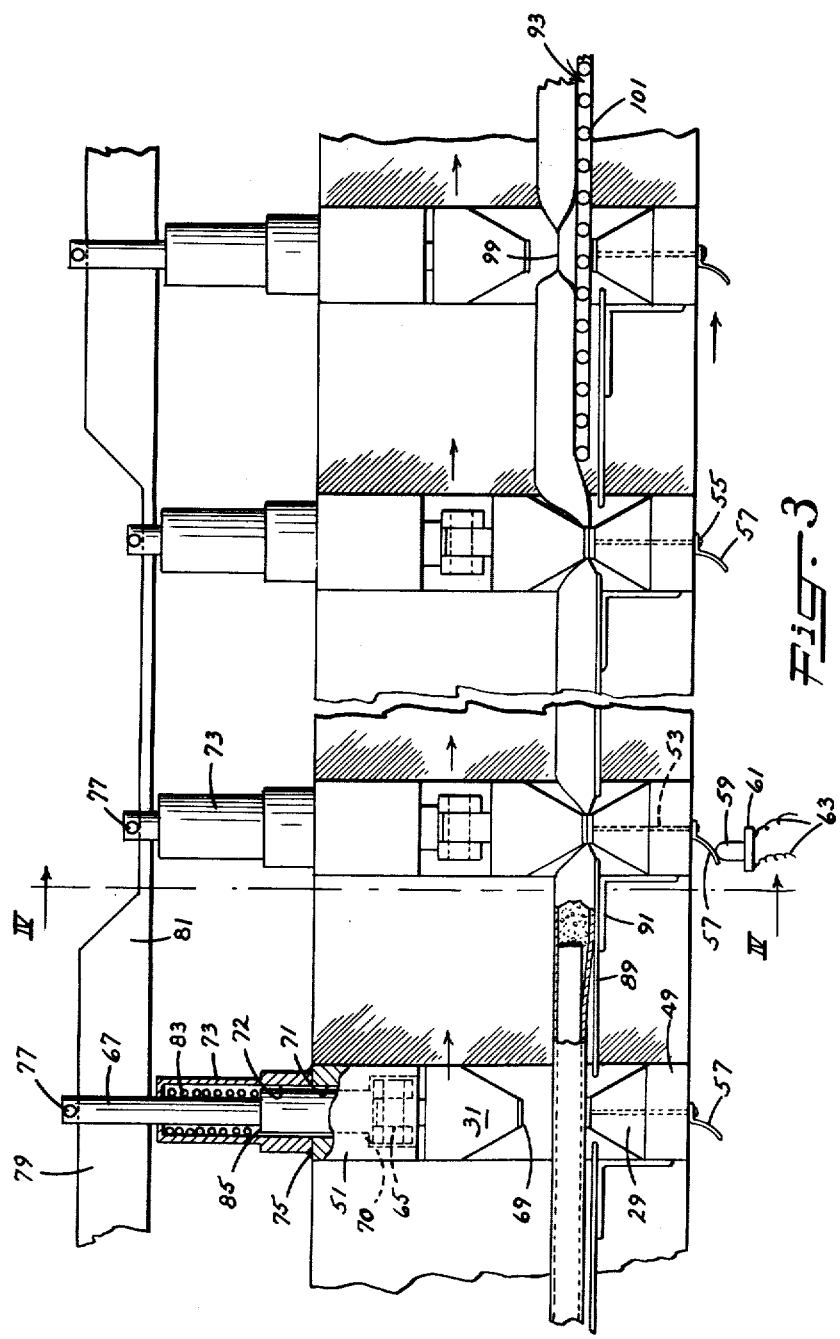

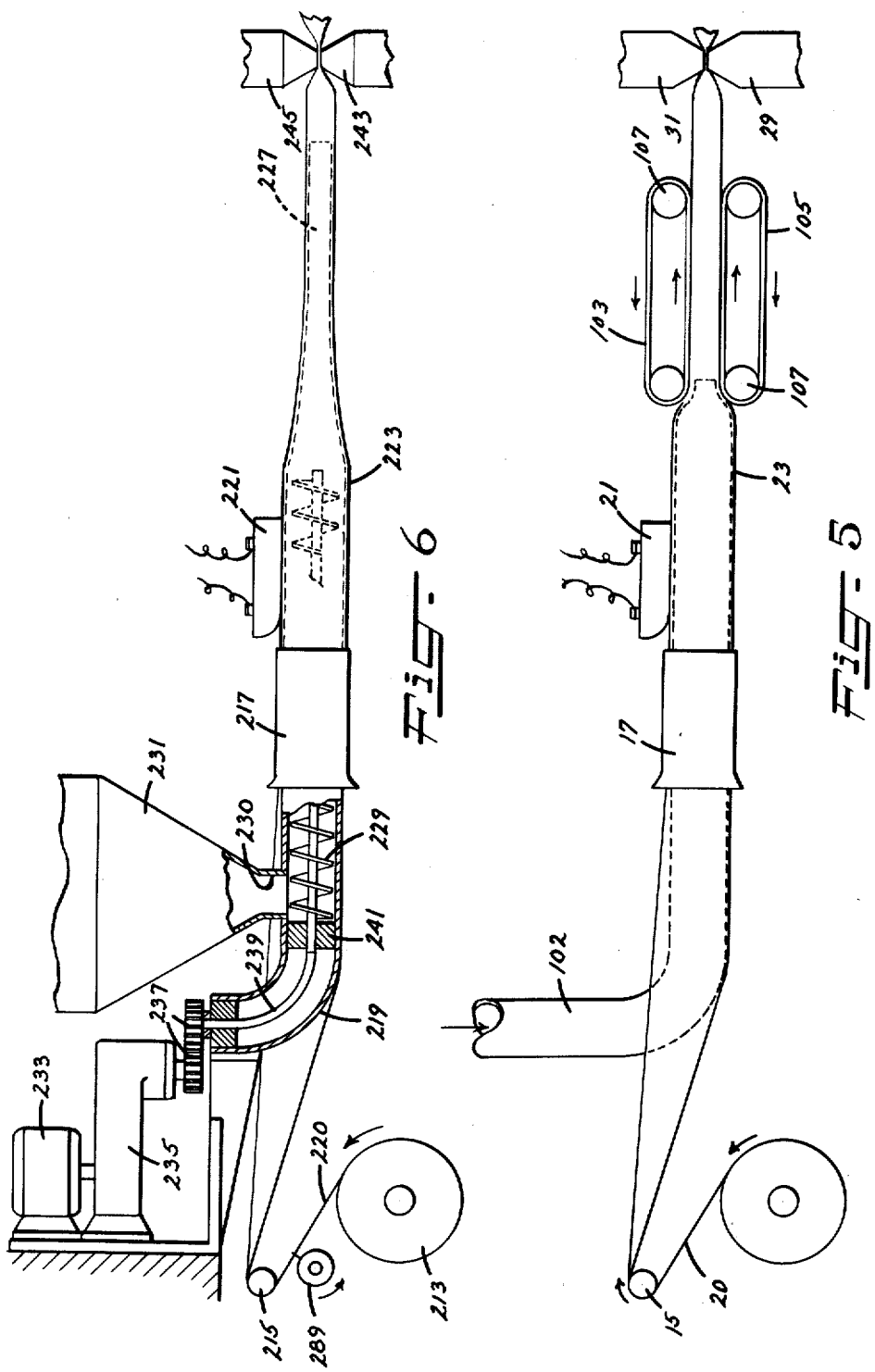

_United States Patent Office_

2,916,864
Patented Dec. 15, 1959

2,916,864

PACKAGING APPARATUS

William E. Meissner, Devon, Pa., assignor to American Viscose Corporation, Philadelphia, Pa., a corporation of Delaware Application December 2, 1957, Serial No. 700,015

15 Claims. (Cl. 53—180)

This invention relates to a continuous and high speed apparatus for packaging fluid, semi-fluid and powdered or granular materials in flexible-walled containers.

Flexible containers have proven their value in providing light, compact, economical and attractive packages for individual or relatively large articles. In the packaging of fluid, semi-fluid and powdered or granular materials, however, the use of flexible walled containers has heretofore been somewhat hindered by the lack of satisfactory high speed packaging methods and apparatus particularly suited for these materials. Attempts have been made, of course, to modifying existing individual article packaging procedures for use with fluid or semi-fluid materials but have resulted, for example, in providing packages with poor or leaky seals, bulky packages in which a large volume of air is entrapped, and perhaps more important, packaging procedures which are slow or of interrupted sequence. Accordingly, a primary object of this invention is to provide a new or improved and more satisfactory apparatus for packaging fluid, semi-fluid, and powdered or granular materials.

Another object is the provision of an improved continuous and high speed apparatus for packaging metered amounts of fluid and semi-fluid materials in individual fluid-tight flexible walled containers within which a minimum of air is entrapped.

Still another object is to provide an improved packaging apparatus in which one or more elongated endless tube-like containers or casings are concomitantly formed and filled with a fluid, semi-fluid or powdered material, then sealed at spaced intervals while being continuously advanced, and finally severed at the sealed areas to provide individual or a series of interconnected packages.

A further object is the provision of an improved apparatus in which an elongated endless casing is concomitantly formed and filled with a fluid, semi-fluid or powdered material and continuously advanced while being simultaneously sealed at spaced intervals, with the sealing being accompanied with a spreading of the contained material at the sealing areas.

A more specific object is to provide an apparatus for packaging powdered or granular materials within flexible-walled containers without containing a substantial volume of air.

These and other objects, features, and advantages will become apparent from the following description of the invention and the drawing relating thereto in which:

Figure 1 is a diagrammatic side view of a portion of the apparatus of the present invention;

Figure 2 is a diagrammatic top view of a portion of the structure shown in Figure 1;

Figure 3 is an enlarged fragmentary view of a portion of a package sealing mechanism shown in Figure 1;

Figure 4 is a traverse vertical section taken along the line IV—IV of Figure 3;

Figure 5 is an enlarged fragmentary side view of a modified delivery means;

Figure 6 is a view similar to Figure 5 illustrating a further modified delivery mechanism particularly suited for use with powdered or granular materials;

Figure 7 is a view similar to Figure 3 showing a modified sealing mechanism particularly adapted for use with the structure shown in Figure 6; and Figure 8 is a side view of the portion of one of the sealing jaws shown in Figure 7.

In general, the objects of the present invention are accomplished by concomitantly forming and filling a continuous flexible casing which is then sealed and severed transversely at longitudinally spaced intervals to provide individual flexible-walled packages. The casing itself is formed by enveloping a continuous flexible film or web of sheet material about a stuffing nozzle with its longitudinal edges sealed to each other in overlapping relation. The material to be packaged is delivered into the casing at a uniform and continuous rate in the case of fluid or semi-fluids and at intermittent intervals when in a powdered or granular form, with the casing being flattened either before or after the stuffing operation to facilitate a metering of the contents being packaged. Transverse sealing of the filled casing is achieved by a series of cooperating sealing jaws which are continuously advanced along parallel horizontal paths and sequentially operated to pinch and heat or cold weld the casing simultaneously with its continuous travel. When packaging powdered or granular materials, means cooperating with the sealing jaws are provided for sweeping the contained materials away from the casing area to be sealed to insure a highly satisfactory bond and to provide a compact package. The series of interconnected packages thus formed are severed at the sealed areas and collected. The particular arrangement and path of the transverse sealing jaws permit two independent casings to be simultaneously sealed without in any manner affecting the operation or transverse sealer itself.

As heretofore mentioned, the apparatus of the present invention is adapted for packaging fluid, semi-fluid and powdered or granular products. While fluid materials or materials which assume a fluid character under normal room temperatures can be packaged with the method and apparatus here described, it is preferred that the less viscous materials be chilled to more readily facilitate the stuffing operation. Thus, products such as ice cream, fruit juice concentrates, butter, oleomargarine, baby foods, and etc. are preferably chilled to a stiff consistency before being delivered to the stuffing nozzle. For example, ice cream and fruit concentrates chilled to approximately 28° F. renders these materials in a semi-fluid and highly desirable condition for stuffing. Materials, normally viscous or stiff, such as meat products, jam, cheese and etc. can be stuffed without any preliminary treatment or conditioning. The powdered or granular materials for which the present invention is adapted can, of course, range in size from relatively small particles such as soap powder, sugar, rice and etc. to relatively large size articles such as pop corn, coffee beans, nuts and etc.

The casing may be formed with a variety of flexible films or webs presently available, as for example, cellophane coated with polyethylene, films formed of vinyl plastics, as for example, polyvinyl alcohol films, and rubber-based films such as a rubber hydrohalide film known in the trade as "Pliofilm." It will be understood that the film or web material selected as the package forming material must be inherently heat-sealed or be coated with a heat-sealable and, when necessary, a moisture-proof substance. From the standpoint of appearance it is, of course, desirable to employ a transparent package forming material.

The apparatus illustrated in Figures 1–3 is particularly suited for packaging fluid and semi-fluid materials and includes, at its delivery side, a supply reel 13, a guide roll 15, a conventional web folding device 17, and a stuffing nozzle 19. A continuous film or web of flexible package forming material 20, wound on the reel 13, is passed over the guide roll 15 and then drawn into the folding device 17 where it is encircled about the stuffing nozzle 19 with its longitudinal edges in overlapping relationship. A heated shoe 21 rides on the overlapped edges of the web material as it leaves the folding device 17 and heat seals the same to provide a substantially cylindrical casing or tube 23. The stuffing nozzle 19 is connected at one end 25 to a suitable source of fluid or semi-fluid material, not shown, while its opposite end is flattened to provide a spade-like discharge portion 27 which serves to distort the casing 23 into a flattened configuration as it passes thereover. The material to be packaged is introduced into the casing immediately as the casing leaves the nozzle 19, and it will be understood that the casing travel and the material delivery are so coordinated as to maintain the casing in its flattened condition. In this manner, each of the finished packages will contain a metered amount of packaged material. As best seen in Figures 3 and 4, the discharge end of the nozzle 19 terminates along a straight line path which is traversed by a series of opposing sealing jaws 29 and 31 carried by one or more endless belts or chains 33 and 35. These belts are trained over a pair of horizontally disposed wheels or sprockets 37 and 39 having shafts 41 and 43, respectively, with at least one of the shafts being driven by suitable means, not shown.

The opposing pairs of sealing jaws 29 and 31 are fixed to the belts 33 and 35 at uniformly spaced intervals by C-shaped supports, each having a web 47 and flanges 49 and 51, the latter of which project outwardly at substantially right angles to the plane of the belt. For the sake of clarity and simplicity, the construction and operation of only a single pair of sealing jaws 29 and 31 will be described, it being understood that all of the pairs of jaws are similar both in structure and function.

With further reference to Figures 3 and 4, the jaws are disposed between the support flanges 49 and 51, with the lower jaws 29 being fixed to the upper surfaces of the flange 49. A Nichrome element or wire 53 extends over the top face of the jaw 29 and is fixed, as by screws 55, to the lower surface of the flange 49. Flexible metallic contacts 57, engaging with the ends of the elements 53, are also secured to the flange 49 by the screws 55, and are designed to complete an electrical circuit through the Nichrome wire 53 as the contacts 57 ride over electrodes 59. A frame 61 supports the electrodes 59 at a desired fixed position along the horizontal path of the sealing jaws, with wires 63 connecting the electrodes to a suitable electrical source. It will, of course, be understood that electrical insulation is provided where needed to separate the Nichrome wire from the adjacent metallic surfaces.

The upper sealing jaw 31 is hinged at 65 to the lower end of a vertically reciprocal follower rod 67, and is provided on its lower face with a bearing plate 69 to insure a uniform pressure application when the sealing jaws are closed. It will be noted that the lower surface of the support flange 51 is recessed at 70 to receive the hinge connection 65 and thus permit the jaw 31 to be fully retracted as it initially moves over the filled casing. The follower rod 67 projects upwardly through aligned openings 71 and 72 formed in the support flange 51 and a cap 73 fixed, as shown at 75, to the upper surface of the flange 51. Control over the movement of the rod 67 is effected by a pin 77 which is fixed to the upper end of rod 67 and rides along the cam surface 79 of the track 81. While not shown on the drawing, the track 81 is maintained in fixed position by an overhead supporting frame work. A coiled compression spring 83, interposed between the cap 73 and a shoulder 85 formed on the rod 67, constantly urges the follower rod 67 in a downward direction and thus, the pin 77 is at all times resiliently maintained in contact with the track 81. If desired, the cap 73 may be adjustably connected to the support flange 51, as for example, by screw threads, to permit a variation in the degree to which the spring 83 is initially compressed.

As the stuffed casing leaves the discharge end of the nozzle 19, it is received on the top surfaces of plates 89 which are fixed to the support flanges 49 by angle bars 91. The plates 89 serve to carry the casing along a desired horizontal level during the sealing operation and thus prevent any package distortion which may result in poor seals or package rupture due to overstressing of the casing film. As the endless belts 33 and 35 start their arcuate path about the wheel 39, as best seen in Figure 3, the series of sealed interconnected packages move onto a roll conveyor 93 which continues to guide the packages along their original straight-line course. The conveyor 93 has an inclined portion 94, shown in Figure 1, along which the packages move by gravity into alignment with a cutting blade 95 and cooperating anvil 96. As indicated by the arrow 97, the blade 95 is reciprocated by any suitable means toward and away from the anvil 96, and is designed to cut centrally through the sealed areas of the casing which are shown at 99. The frequency of the blade reciprocation may, of course, be adjusted to provide either individual packages or a series of interconnected packages. Following the cutting operation, the packages ride down onto a belt conveyor 101 and are carried, for example, to a packing station where they are collected.

In the operation of the above described apparatus, the continuous web or film of package forming material 20 is initially drawn from the reel 13, passed over the guide roll 15, and then threaded through the folding device 17. During its passage through the folding device 17, the film 20 is enveloped about the stuffing nozzle 19 with its longitudinal edges disposed in overlapping relationship, in which position they are sealed to each other by the heated shoe 21. The substantially cylindrical casing 23 thus formed is advanced continuously over the nozzle portion 27 where it is distorted into a flattened configuration as best seen in Figure 4. Immediately upon leaving the nozzle 19, the casing 23 is filled with a fluid or semi-fluid material. It will be noted that the discharge portion of the nozzle 19 is substantially parallel to the adjacent reach of the belts 33 and 35 and projects well into the path of the sealing jaws 29 and 31. Thus, the casing 23 actually rests on the plates 89 during the stuffing operation. The plates 89 carry the filled casing between the pairs of opposed sealing jaws as they move about the wheel 37 and enter their generally straight-line course of travel. As heretofore mentioned, the travel of the endless belts 33 and 35 is coordinated with the material delivery to insure that the finished packages each contain a metered amount of packaged material.

Transverse sealing of the stuffed casing is actually effected when the opposing jaws 29 and 31 are brought together and the Nichrome element 53 is energized. Thus, as the pins 77 sequentially ride down into the recessed portion of the cam track 81, the compression springs 83 urge the follower rods 67 and the upper sealing jaws 31 downwardly toward the lower stationary jaws 29 so as to squeeze the contained material longitudinally of the casing and grip or pinch opposite wall portions of the casing therebetween. The resilient force of the springs 83 is such as to cause the upper jaws 31 to somewhat forcefully engage with the casing and thus effectively squeeze all of the fluid or semi-fluid material away from between the opposed sealing jaws. It will be here noted that the hinge connections of the upper sealing jaws 31 to their respective follower rods 67 permit the jaws to adjust themselves laterally of the straight line path and thus insure uniform contact between the opposing jaws along the entire width of the casing.

The continuous travel of the endless belts 33 and 35 sequentially carry the enclosed pairs of sealing jaws over the electrodes 59, the latter of which are engaged by the flexible contact strips 57 and cause a momentary flow of electrical current through the Nichrome element 53. This almost instantaneous application of electrical current effects a rapid heating of the relatively thin Nichrome element 53 which satisfactorily bonds the opposite walls of the casing, even though the belts 33 and 35 are traveling at a relatively high speed. For example, when employing a polyethylene coated cellophane as the package-forming material 20, the flow of current through the Nichrome wire for approximately one-half second is sufficient to weld the opposite walls of the casing to each other. As seen in Figure 3, the recessed portion of the track 81 is extended beyond the horizontal position of the electrodes 59 so as to maintain the transversely sealed areas of the casing under pressure until the Nichrome elements have cooled. The upward movement of the pins 77 to the elevated portion of the track 81 raises the rods 67 and the upper sealing jaws 31 against the resilient action of the springs 83.

Just prior to the initial movement of the belts 33 and 35 into their arcuate path about the wheel 39, the series of interconnected packages ride onto the roll conveyor 93 and continue along their original course of travel toward the severing blade 95. As previously mentioned, the reciprocating movement of the blade 95 is selectively controlled so as to strike the anvil 96 at intermittent intervals which are of such duration as to permit one or more packages to pass between these parts. The weight of the interconnected packages themselves provide sufficient inertia for drawing the same down the inclined conveyor portion 94 and into alignment with the cutting blade 95 and anvil 96. While the severing operation of the blade 95 is intermittent, the rapid cutting action, combined with the flexibility of interconnected packages and the free rotation of the conveyor rolls, assures a satisfactory packaging operation without any substantial backing-up of the series of packages and without, in any manner, affecting the continuous nature of casing formation, filling, and sealing procedures. Since the casing is snugly gripped between the pairs of opposed sealing jaws during the transverse sealing operation, the continuous movement of the endless belts 33 and 35 provides a sufficient pulling force for drawing the package-forming film through the casing forming mechanism and over the stuffing nozzle.

As illustrated in Figure 2, the packaging capacity of the apparatus here described can be doubled by merely passing a second casing 423 between the pairs of opposing sealing jaws 29 and 31 located along the reach of the belts opposite and parallel to the belt reach heretofore mentioned. Thus, at a position diagonally opposite the nozzle 19, a second continuous web or film of package-forming material 420 may be drawn from a reel 413, passed over a guide roll 415 and threaded into and through a folding device 417. In the same manner as heretofore mentioned, the film 420 is shaped about the stuffing nozzle 419 by the folding device 417 and emerges therefrom with its longitudinal edges in overlapping relationship, in which position they are sealed to each other by the heated shoe 421. The resulting substantially cylindrical casing 423 is flattened as it travels over the nozzle portion 427 and is then filled, transversely sealed by the jaws 29 and 31, and finally severed at spaced intervals by apparatus similar to that described above.

In lieu of the nozzle arrangement described above, a conventional cylindrical nozzle 102 may be employed in filling the casing 23, which is subsequently passed between a pair of cooperating endless belts 103 and 105 trained over rotatable drums 107 as shown in Figure 5. The belts 103 and 105 are spaced apart to such a degree as to cause the stuffed cylindrical casing 23 to be pressed into a flattened condition before it enters inbetween and is sealed by the cooperating pairs of sealing jaws. The transverse sealing and severing of the casing is accomplished in the same manner as described above.

The apparatus illustrated in Figures 6–8 can be used in packaging fluid and semi-fluid materials but is particularly designed for use with powdered or granular materials. As with the structure as heretofore described, a casing is formed in this modified packaging apparatus by drawing a web or film 220 from a supply reel 213, over a guide roll 215, and through a forming device 217 where it is enveloped about a stuffing nozzle 219 with its longitudinal edges in overlapping relationship. A heat sealing shoe 221 rides on the overlapping film edges and seals the same to each other to form an integral joint and complete formation of the casing 223.

As with the apparatus shown in Figures 1–4, the material to be packaged is delivered into the casing 223 as it is advanced beyond the end of the flattened nozzle portion 227. When packaging powdered or granular material, however, it is desirable that these materials be fed into the casing 223 as individual metered amounts or charges so as to better facilitate the transverse sealing of the casing as more fully described hereafter. To accomplish this function, the nozzle 219 is provided with a screw conveyor 229 which is disposed below a discharge opening 230 of a supply hopper 231, and is intermittently turned by a motor 233 acting through a speed reducer 234, meshing gears 237, and a flexible shaft 239. A wall 241, fixed within the nozzle 219, serves both as a bearing for the screw conveyor 229 and as a material deflecting means.

Sealing of the stuffed casing at intermittent intervals to provide a series of interconnected packages is accomplished in a manner somewhat similar to that heretofore described by a series of cooperating pairs of sealing jaws 243 and 245. C-shaped supports 247 are secured at their webs 249 to a pair of endless belts 251 and 253 and carry the sealing jaws along the desired horizontal path, as the belts are moved, for example, by means such as shown in Figure 2. The lower sealing jaw 243 of each pair of sealing jaws is both structurally and functionally similar to the jaw 29 described above in that it is fixed to the support 247 and is equipped with a Nichrome wire or element 255 which is selectively energized by electrodes as shown in Figure 3. The upper jaw 245 of each pair of cooperating sealing jaws, however, is fixed to one end of a follower rod 257 which extends up through a sleeve 259 and carries a pin 261 at its upper end. The pin 261 rides within a cam slot 263 formed in a stationary track 265, which corresponds to the track 81 shown in Figure 1, and in this manner each follower rod 257 is reciprocated vertically relative to its sleeve 259 in accordance with the cam pattern of the slot 263. The sleeves 259 are in turn each slidably mounted relative to the upper flange 267 of the supports 247, and are moved with the follower rods along their initial downward movement by reason of the springs 269 which are interposed between the sleeves 259 and collars 270 fixed to the follower rods.

To the lower end of each of the sleeves 259 is fixed a bracket or saddle member 271 having downwardly extending projections 273, each of which is slotted at 275. These slotted projections 273 serve as bearings for trunnions 277 formed at the upper ends of a pair of cooperating spreading or sweep arms 279. The elongated nature of the slots 275 permit the trunnions 277 and their sweep arms to move in a vertical direction, during the sealing operation, with compression springs 281 disposed within the slots 275 for normally urging the sweep arms downwardly. Leaf springs 283, secured to the saddle members at 285, resiliently urge the sweep arms 279 toward each other as shown at the left side of Figure 7.

The operation of this embodiment of the invention is generally similar to that heretofore described. Initially, the web or film of package forming material 220 is drawn from the reel 213, passed over the guide roll 215, and then threaded through the folding device 217 where it is deformed about the stuffing nozzle 219 with its longitudinal edges in overlapping relationship. The heat sealing shoe 221 welds the overlapping film edges to provide a substantially cylindrical casing 223 which is flattened as it travels over the nozzle portion 227. When packaging powdered or granular substances, these materials are delivered from the hopper 231 and into the flattened casing 223 at intermittent intervals by the screw conveyor 229 which is actuated, at interrupted intervals, by the motor 233. In much the same manner as described with regard to the apparatus illustrated in Figures 1-4, the stuffed casing follows a generally straight-line course from the nozzle 219, parallel to the adjacent reach of the belts 251 and 253, and into the path of the oncoming series of sealing jaws 243 and 245.

The spaced charges of powdered or granular material within the casing 223 are supported by plates 287 fixed to the supports 247 so as to prevent any undue distortion of the casing and, more important, to prevent the powdered or granular material from spreading or shifting within the casing itself. As the pins 261 approach and sequentially enter the inclined and lowermost portion of the cam slot 263, the follower rods 257 are moved in a downward direction. In view of the resilient action of the compression springs 269, the follower rods 257 and their respective sleeves 259 initially move downward as a unit until the free ends of the sweep arms 279 engage with the areas of the casing between the spaced charges of packaged material. At this stage of the process, the casing is pinched as shown at the center of Figure 7, and further downward movement of the saddle members 271 and the sweep arms 279 is arrested. The follower rods 257, however, continue their downward travel until the sealing jaw 245 attains a position as shown at the right side of Figure 7, whereby the casing is firmly gripped between the opposing jaws and sealed by energization of the Nichrome element 255.

During this final downward movement of the rods 257, the tapered faces 288 of the upper jaws 245 bear against and cam the sweep arms 279 away from each other, thus causing their free ends to squeeze the charge of powdered material away from the area of the casing to be sealed. The sweeping movement of the arms 279 serves to gather the contained material into a compact mass, and thus it is desirable that the casing film be provided with tiny openings, as for example by a pinwheel 289, so that substantially all of the air within the casing can escape during this compacting action. With little or no contained air, it will be apparent that the finished package will occupy a minimum of space and will eliminate any tendency for the packaged material to shift within the package itself. After the transverse sealing of the casing, the series of packages are conveyed to a cutting station and severed at the sealed areas as in the method of Figures 1-3. It will be further understood that the apparatus of Figures 6-8 is also suited for simultaneously filling, sealing, and severing two continuous casings in a manner as shown in Figure 2.

To facilitate a smooth movement of the sweep arms 279 along the walls of the casing during the squeezing operation, the free ends of these arms are preferably coated or provided with an insert 291 formed of polytetrafluoroethylene resin (Teflon) or similar material. Alternatively, or additionally, the exterior of the casing may be dusted with a lubricating powder, such as talc, to permit the sweep arms to more readily perform their squeezing action.

In all of the above described modifications of the present invention, transverse sealing of the casing is accomplished by the combined use of heat and pressure. An alternative sealing procedure, employing pressure alone, has also proved satisfactory especially when it is desired that the end seals of the individual packages be weaker than its longitudinal seal to more readily effect the discharge of the contents, as for example by squeezing the package itself. Powdered or granular materials in a static condition, will exert little or no pressure on the package end seals and thus there is little danger that the packages will unintentionally rupture at these areas. On the other hand, the pressure of fluid or semi-fluid materials will vary with the viscosity of the material packaged and thus it is a simple matter for the operator to select the particular type of seal best suited for the material being packaged.

As heretofore mentioned, the transverse cold seals are effected solely by the use of pressure. Thus, the resilient and somewhat forceful closing of the jaws 29 and 31 or 243 and 245, with the Nichrome elements 53 and 255 being disconnected, causes the opposite walls of the casing to adhere, and in effect, cold weld to each other. If desired, a more tenacious seal can be provided by corrugating or knurling the opposing surfaces of the sealing jaws so as to deform the casing walls into interlocking relationship.

By means of the above described apparatus, the packaging of fluid, semi-fluid, powdered or granular materials in flexible wall containers can be accomplished in a continuous manner. Further, the use of a single transverse sealing mechanism with a pair of stuffing nozzles as illustrated in Figure 2 facilitate a high productive rate with a minimum of machinery and supervision. In addition, the transverse sealing of the casing can be accomplished by either hot or cold welding procedures and thus the end seals of the individual packages can be made of any desired strength.

It is seen from the above description that the objects of the invention are well fulfilled by the apparatus described. The description is intended to be illustrative only and it is to be understood that changes and variations may be made without departing from the spirit and scope of the invention as defined by the appended claims.

I claim:

1. A continuous packaging apparatus including means for forming a continuous casing from a web of sheet material, means for delivering material to be packaged into the casing, and means for sealing the casing transversely at longitudinally spaced intervals, said transverse sealing means including at least one pair of opposed sealing jaws, an endless belt supporting said jaws, means for driving said belt along a path disposed in a substantially horizontal plane for continuously advancing said pair of jaws into positions on opposite sides of the filled casing, and means disposed adjacent to one reach of said endless belt for closing and opening said jaws to seal the casing transversely concomitantly with its continuous movement.

2. Apparatus as defined in claim 1 wherein said last-mentioned means is a cam track and wherein the upper jaw of said pair of opposed jaws is reciprocated vertically toward and away from said lower jaw by said cam track.

3. Apparatus as defined in claim 1 further including means for spreading the material to be packaged within the casing prior to transverse sealing of the casing by said opposing jaws.

4. Apparatus as defined in claim 1 further including an intermittently actuated cutting mechanism and means for conveying the transversely sealed casing to said cutting mechanism for severing the same at the transverse seals and providing individual packages.

5. Apparatus as defined in claim 1 wherein a plurality of pairs of opposed sealing jaws are carried by said endless belt at longitudinally spaced intervals thereof, and further including means for forming a second continuous casing from a web of sheet material, and means for delivering material to be packaged into the second continuous casing, said last-mentioned casing-forming and material delivery means being positioned substantially diagonally across from said first-mentioned casing-forming and material delivery means and adjacent to one end of a second reach of said endless belt which extends parallel to said one reach.

6. A continuous packaging apparatus including means for forming a continuous casing from a web of sheet material, means for delivering material to be packaged into the casing, an endless belt having one reach disposed along the path of the casing as it leaves said material delivery means, at least one pair of opposing sealing jaws carried by said endless belt, means for driving said endless belt along a path disposed in a substantially horizontal plane for continuously advancing said pair of sealing jaws into positions on opposite sides of the filled casing, resilient means for urging the upper jaw of said pair of sealing jaws upwardly away from the lower of said jaws, a cam for selectively moving said upper jaw downwardly toward the lower of said jaws to effect a sealing of the casing transversely thereof, and means for flattening said casing prior to its entry between said sealing jaws.

7. Apparatus as defined in claim 6 further including an electrical heating element disposed on each of said lower sealing jaws and electrodes positioned along the path of said one reach of said endless belt for individually energizing said heating elements when said sealing jaws are closed.

8. A continuous packaging apparatus including means for forming a casing from a web of sheet material, means for delivering material to be packaged into the casing, an endless belt having one reach disposed along the path of the casing as it leaves said material delivery means, a plurality of pairs of opposing sealing jaws carried by said endless belt, means for driving said endless belt along a path disposed in a substantially horizontal plane for continuously advancing the opposing jaws of each pair of sealing jaws into positions on opposite sides of the filled casing, the upper jaw of each of said pairs of jaws being mounted for vertical reciprocation toward and away from said lower jaw to effect a transverse sealing of said casing at longitudinally spaced intervals, resilient means for urging said upper jaws toward said lower jaws, cam means for sequentially moving and maintaining the upper jaws spaced away from their respective lower jaws as said jaws enter and leave said one reach of the endless belt, an electrical heating element carried by each of the lower of said sealing jaws, and means fixed along the path of the filled casing for individually and sequentially energizing said heating elements as said opposing pairs of sealing jaws are closed to effect a transverse sealing of said casing at longitudinally spaced intervals.

9. Apparatus as defined in claim 8 further including a cutting mechanism for severing the casing at the transverse seals thereof, and a conveyor including a series of freely rotatable rolls for receiving the casing as it leaves said sealing jaws and guiding the same to said cutting mechanism.

10. Apparatus as defined in claim 8 further including means for flattening the casing prior to its entry in between the pairs of opposing sealing jaws, and means carried by each of said lower sealing jaws for supporting the filled casing along said one reach of the endless belt.

11. Apparatus as defined in claim 8 further including means for forming a second continuous casing from a web of sheet material, means for delivering material to be packaged into the second continuous casing, said last-mentioned casing-forming and material delivery means being positioned substantially diagonally across from said first-mentioned casing-forming and material delivery means and adjacent to one end of a second reach of said endless belt which extends parallel to said one reach, the second continuous casing being adapted to enter in between said pairs of opposed sealing jaws as they move along said second reach, and means for sequentially closing and opening said jaws between the ends of said second reach.

12. A continuous packaging apparatus including means for forming a casing from a web of sheet material, means for delivering material to be packaged into the casing, an endless belt having one reach disposed along the path of the casing as it leaves said material delivery means, a plurality of pairs of opposed sealing jaws carried by said endless belt, means for driving said endless belt along a path disposed in a substantially horizontal plane for continuously advancing the opposing jaws of each pair of sealing jaws into positions on opposite sides of the filled casing, a follower rod for each upper jaw of said pairs of sealing jaws, a sleeve encircling each of said follower rods and being movable relative thereto, means supporting said sleeves for vertically sliding movement, cam means for urging each of said rods and upper jaws downwardly toward their respective lower jaws, a pair of pivotally mounted sweep arms carried at the lower end of each of said sleeves adjacent to and on opposite sides of its respective lower jaw, resilient means associated with each of said rods and sleeves for causing said sleeves to move downwardly with said rods until said sweep arms contact the filled casing, and cam means on each of said upper jaws for spreading the adjacent sweep arms as the upper jaws are lowered against the casing to cause the contained material within the casing to be moved away from the seal area.

13. Apparatus as defined in claim 12 wherein each pair of said sweep arms are resiliently mounted for limited vertical travel and are resiliently urged toward each other.

14. Apparatus as defined in claim 12 wherein the material to be packaged is delivered into the casing at intermittent intervals and further including means for providing the casing with perforations.

15. Apparatus as defined in claim 12 further including means for forming a second continuous casing from a web of sheet material, means for delivering material to be packaged into the second continuous casing, said last-mentioned casing-forming and material delivery means being positioned substantially diagonally across from said first-mentioned casing-forming and material delivery means and adjacent to one end of a second reach of said endless belt which extends parallel to said one reach, the second continuous casing being adapted to enter in between said pairs of opposed sealing jaws as they move along said second reach, and means for sequentially closing and opening said jaws between the ends of said second reach.

References Cited in the file of this patent

UNITED STATES PATENTS

| | | |
|---|---|---|
| 2,146,308 | Maxfield | Feb. 7, 1939 |
| 2,146,831 | Maxfield | Feb. 14, 1939 |
| 2,693,067 | Williams | Nov. 2, 1954 |
| 2,761,264 | Gossett | Sept. 4, 1956 |
| 2,828,591 | Vanden Bossche | Apr. 1, 1958 |